United States Patent
Yaung

(10) Patent No.: US 7,069,536 B2
(45) Date of Patent: Jun. 27, 2006

(54) METHOD, SYSTEM, AND PROGRAM FOR EXECUTING A WORKFLOW

(75) Inventor: Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 09/894,076

(22) Filed: Jun. 28, 2001

(65) Prior Publication Data

US 2003/0004771 A1    Jan. 2, 2003

(51) Int. Cl.
*G06F 9/44* (2006.01)
(52) U.S. Cl. ............... 717/102; 717/108; 717/116; 705/7; 707/8; 715/965
(58) Field of Classification Search ........ 717/100–105, 717/109, 113, 120–123; 705/1, 7–9; 715/513, 715/965, 762, 763; 719/310, 320, 328; 714/16; 707/8
See application file for complete search history.

(56) References Cited

U.S. PATENT DOCUMENTS

| | | | |
|---|---|---|---|
| 5,301,320 A | 4/1994 | McAtee et al. ............... 705/9 |
| 5,535,322 A | 7/1996 | Hecht ........................... 705/1 |
| 5,572,673 A | 11/1996 | Shurts .................... 101/401.5 |
| 5,596,744 A | 1/1997 | Dao et al. ..................... 707/10 |
| 5,596,750 A | 1/1997 | Li et al. |
| 5,634,053 A | 5/1997 | Noble et al. .................. 707/4 |
| 5,634,127 A | 5/1997 | Cloud et al. ................ 719/313 |
| 5,644,768 A | 7/1997 | Periwal et al. |
| 5,721,912 A | 2/1998 | Stepczyk et al. ........... 707/102 |
| 5,721,913 A | 2/1998 | Ackroff et al. ......... 707/103 R |
| 5,734,837 A | 3/1998 | Flores et al. ................. 705/7 |
| 5,745,683 A | 4/1998 | Lee et al. ................. 709/250 |
| 5,745,687 A | 4/1998 | Randell |
| 5,752,027 A | 5/1998 | Familiar ................. 707/103 R |
| 5,774,661 A | 6/1998 | Chatterjee et al. .......... 709/203 |
| 5,790,789 A | 8/1998 | Suarez |
| 5,794,250 A | 8/1998 | Cariño, Jr. et al. ............. 707/9 |
| 5,826,086 A * | 10/1998 | Arima et al. ................ 717/105 |
| 5,826,239 A | 10/1998 | Du et al. ........................ 705/8 |
| 5,860,066 A | 1/1999 | Rouse ........................... 705/1 |
| 5,864,843 A | 1/1999 | Cariño, Jr. et al. ............. 707/4 |
| 5,873,083 A | 2/1999 | Jones et al. ..................... 707/4 |
| 5,892,905 A * | 4/1999 | Brandt et al. ............... 713/201 |
| 5,913,214 A | 6/1999 | Madnick et al. .............. 707/10 |
| 5,926,636 A | 7/1999 | Lam et al. ................... 719/313 |
| 5,930,512 A | 7/1999 | Boden et al. ................ 717/102 |

(Continued)

FOREIGN PATENT DOCUMENTS

EP        982675        8/1999

(Continued)

OTHER PUBLICATIONS

Mohan, Workflow Management in the Internet Age, Aug. 1997, IBM Almaden Research Center.*

(Continued)

*Primary Examiner*—Antony Nguyen-Ba
(74) *Attorney, Agent, or Firm*—David W. Victor; Konrad Raynes & Victor LLP

(57) ABSTRACT

Provided is a method, system, and program for executing a workflow. A workflow class implement methods and objects to provide information on and control of workflows. A work list class implements methods and objects to provide information on and manipulate work items assigned to the workflows. A work item class implements methods and objects to provide information on and manipulate work items when executing one workflow.

39 Claims, 10 Drawing Sheets

U.S. PATENT DOCUMENTS

| | | | |
|---|---|---|---|
| 5,937,388 A | 8/1999 | Davis et al. ............... 705/8 | |
| 5,951,649 A | 9/1999 | Dobbins et al. | |
| 5,960,420 A | 9/1999 | Leymann et al. | |
| 5,987,422 A | 11/1999 | Buzsaki ............... 705/9 | |
| 5,991,733 A | 11/1999 | Aleia et al. | |
| 6,006,193 A | 12/1999 | Gibson et al. | |
| 6,012,067 A | 1/2000 | Sarkar ............... 707/103 R | |
| 6,044,378 A | 3/2000 | Gladney ............... 707/103 R | |
| 6,061,667 A | 5/2000 | Danford-Klein et al. | |
| 6,065,009 A | 5/2000 | Leymann et al. ............... 707/10 | |
| 6,073,109 A | 6/2000 | Flores et al. ............... 705/8 | |
| 6,073,111 A | 6/2000 | Leymann et al. ............... 705/8 | |
| 6,115,646 A | 9/2000 | Fiszman et al. ............... 700/181 | |
| 6,151,583 A | 11/2000 | Ohmura et al. | |
| 6,170,002 B1 | 1/2001 | Ouchi | |
| 6,226,641 B1* | 5/2001 | Hickson et al. ............... 707/8 | |
| 6,278,977 B1* | 8/2001 | Agrawal et al. ............... 705/7 | |
| 6,308,163 B1 | 10/2001 | Du et al. | |
| 6,338,074 B1 | 1/2002 | Poindexter et al. | |
| 6,349,238 B1 | 2/2002 | Gabbita et al. | |
| 6,430,538 B1 | 8/2002 | Bacon et al. | |
| 6,453,320 B1* | 9/2002 | Kukura et al. ............... 707/103 R | |
| 6,487,607 B1 | 11/2002 | Wollrath et al. | |
| 6,578,006 B1 | 6/2003 | Saito et al. | |
| 6,606,740 B1* | 8/2003 | Lynn et al. ............... 717/100 | |
| 6,665,674 B1 | 12/2003 | Buchanan et al. | |
| 6,665,814 B1* | 12/2003 | Hobson et al. ............... 714/16 | |
| 6,681,243 B1 | 1/2004 | Putzolu et al. | |
| 6,691,299 B1 | 2/2004 | Hart et al. | |
| 6,721,713 B1 | 4/2004 | Guheen et al. | |
| 6,769,113 B1* | 7/2004 | Bloom et al. ............... 717/103 | |
| 6,769,124 B1 | 7/2004 | Schoening et al. | |
| 6,816,902 B1* | 11/2004 | Bandat et al. ............... 709/226 | |
| 6,853,974 B1 | 2/2005 | Akifuji et al. | |
| 6,877,153 B1* | 4/2005 | Konnersman ............... 717/100 | |
| 6,920,456 B1 | 7/2005 | Lee et al. | |
| 2002/0032783 A1 | 3/2002 | Tuatini | |
| 2002/0038357 A1 | 3/2002 | Haverstock et al. | |
| 2002/0040312 A1 | 4/2002 | Dhar et al. | |
| 2002/0059411 A1 | 5/2002 | Bamhouse et al. | |
| 2002/0103811 A1 | 8/2002 | Fankhauser et al. | |
| 2002/0120685 A1 | 8/2002 | Srivastava et al. | |
| 2002/0143949 A1 | 10/2002 | Rajarajan et al. | |
| 2003/0023472 A1* | 1/2003 | Lee et al. ............... 705/8 | |
| 2003/0023662 A1* | 1/2003 | Yaung ............... 709/106 | |
| 2003/0023728 A1* | 1/2003 | Yaung ............... 709/226 | |
| 2003/0023773 A1* | 1/2003 | Lee et al. ............... 709/328 | |
| 2003/0028550 A1* | 2/2003 | Lee et al. ............... 707/200 | |
| 2003/0033415 A1 | 2/2003 | Graylin et al. | |
| 2003/0131075 A1 | 7/2003 | Bear et al. | |
| 2004/0015821 A1 | 1/2004 | Lu et al. | |

FOREIGN PATENT DOCUMENTS

| | | |
|---|---|---|
| JP | 10-081425 | 3/1998 |
| JP | 10-326314 | 12/1998 |
| JP | 11-003298 | 1/1999 |
| JP | 11-175644 | 7/1999 |
| JP | 11-249983 | 9/1999 |
| WO | 9963469 | 12/1999 |
| WO | 0014618 | 3/2000 |

OTHER PUBLICATIONS

Nyberg, Workflow Definition Languages, Nov. 2000, Tik-76.273 Seminar on Database Management.*

Leymann-Roller, Workflow-based applications, 1997, IBM Systems Journal, vol. 36, No. 1.*

Reinwald-Mohan, Structured Workflow Management with Lotus Notes Release 4, Feb. 1996, Proc. 41th IEEE Computer society Int'l Conference (CompCon), digest of papers, pp. 451-457.*

Kelly Trammel, Workflow Without Fear, Apr. 1996, BYTE. com, http://www.byte.com/art/9604/sec8/art1.htm.*

WP4, Suitable Interface Adaptor, Dec. 1999, CrossFlow consortium, www.crossflow.org/public/pubdel/DB6.pdf.*

Nyberg, Workflow Definition Languages, Nov. 2000, Tik-76.273 Seminar on Database Management.*

Reinwald-Mohan, Structured Workflow Management with Lotus Notes release 4, Feb. 1996, Proc. 41th IEEE Computer Society Int'l Conference (CompCon), digest of papers, pp. 451-457, Santa Clara, CA, Feb. 1996.*

Mohan, Workflow Management in the Internet Age, Aug. 1997, IBM Almaden Research Center.*

U.S. Appl. No. 09/894,074, filed Jun. 28, 2001, entitled, "Method, System, and Program for Generating a Workflow", invented by WF Miller and AT Yaung.

U.S. Appl. No. 09/894,413, filed Jun. 28, 2001, entitled, "Method, System, and Program for Using Objects in Data Stores Execution of a Workflow", invented by JJ Lin; WF Miller; and AT Yaung.

Galtzur, Z. et al. "Managing Workflow Using Database Techniques", IBM Technical Disclosure Bulletin, vol. 39, No. 8, Aug. 1996, pp. 199-201.

Yong, Y.M. "Template-Driven Document-Exchange Specification", IBM Technical Disclosure Bulletin, vol. 39, No. 11, Nov. 1996, pp. 173-178.

Duscher, R. et al. "Audit Trail Support For Program Activity Implementations of Workflow Management Systems", 1994, pp. 1-4.

Dr. Leymann, F. et al. "Context Support For Program Activity Implementations of Workflow Management Systems", 1994, pp. 1-4.

Sluiman, H. "A Relational Schema to Support Task and Workflow, Data Collection and Analysis", pp. 1-3.

IBM Corp. "Chapter 4. Introducing Enterprise Information Portal Workflow" from *Managing Enterprise Information Portal*, IBM Enterprise Information Portal for Multiplatforms, Version 7.1, #SC27-0875-00, Product Nos. 5697-G29 and 5697-G31, Aug. 2000, pp. iii-iv and pp. 39-45.

IBM, Corp. "Concepts and Architecture" IBM MQSeries Workflow, Version 3.3, #GH12-6285-03, Product No. 5697-FM3, Mar. 2001, pp. iii-58.

IBM, Corp. "User's Guide for the Work Management Builder" IBM ImagePlus Workfolder Application Facility for AS/400, Version 4 Release 1, #SC34-4587-00, Program No. 5733-A18, Sep. 1997, pp. iii-119.

Su, Syw et al. "An Extensible Knowledge Base Management System for Supporting Rule-based Interoperability among Heterogeneous Systems" 1995, ACM # 0-89791-812-6/95/11, pp. 1-10.

Johansson, Se et al. "Expert Workflow, Building Knowledge-Based Workflow Systems with Object Technology", 1997, pp. 45-49.

Leymann, F. et al. "Workflow-based Applications" [online], vol. 36, No. 1 —Application Development, pp. 1-22, plus 9 pages of linked Figures (drawings), and 2 pages of "Cited References and Notes". [Retrieved on May 17, 2001]. Retrieved from the Internet at <URL: http://www.research.ibm.com/journal/sj/361/leymann.html>.

Vossen, G. "The WASA2 Object-Oriented Workflow Management System", 1999, ACM # 1-58113-084-8/99/05, pp. 587-589.

Choudhury, G.S., C. Requardt, L. Fujinaga, T. Dilauro, E.W. Brown, J.W. Warner, and B. Harrington, "Digital Workflow Management: The Lester S. Levy Digitalized Collection of Sheet Music", [online], © 2000 *First Monday*, [Retrieved on Mar. 17, 2005], retrieved from the Internet at <URL:http://firstmonday.org/issues/issue5_6/choudhury/index.html>.

Hudgins, J. and L.A. MAcklin, "New Materials, New Processes: Implementing Digital Imaging Projects into Existing Workflow", *Library Collections, Acquisitions, & Technical Services*, 2000, No. 24, pp. 189-204.

IBM Corporation, "Method for Testing Program Activity Implementations of Workflow Management Systems", *IBM Research Disclosure*, No. 408186, Apr. 1998, pp. 503-505.

IBM Corporation, "Non-Destructive Annotation of Documents in an Image Processing Environment", *IBM Research Disclosure*, No. 430191, Feb. 2000, pp. 404-408.

IBM Corporation, "Runtime Transaction Management in a Transaction Service", *IBM Research Disclosure*, No. 416150, Dec. 1998, pp. 1720-1721.

Spitzer, T., "forms, Workflow, and the Web", [online], [Retrieved on Mar. 17, 2005], retrieved from the Internet at <URL: http://www.webtechniques.com/archives/1999/10/busi/>.

* cited by examiner

METHOD, SYSTEM, AND PROGRAM FOR EXECUTING A WORKFLOW

RELATED APPLICATIONS

This application is related to the following copending and commonly assigned patent filed on the same date herewith, which are incorporated herein by reference in their entirety:
"Method, System, and Program for Generating a Workflow", having application Ser. No. 09/894074; and
"Method, System, and Program for Using Objects In Data Stores During Execution of a Workflow", having application Ser. No. 09/894413.

BACKGROUND OF THE INVENTION

1. Field of the Invention

The present invention relates to a method, system, and program for executing a workflow.

2. Description of the Related Art

A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines (IBM) MQSeries Workflow software product. A process modeler is a person that analyzes the business operations, determines how the information related to the operations is routed electronically to client computers, and then defines a workflow model of the operations. The workflow model may be coded in the FlowMark Definition Language (FDL). The workflow model is then imported into a Runtime program that verifies and translates the workflow model into a process template. An instance of the process template can then be invoked to automates the sequence of events defined by the model.

There is a continued need in the art to provide improved techniques for building and utilizing workflow models.

SUMMARY OF THE PREFERRED EMBODIMENTS

Provided is a method, system, and program for executing a workflow. Workflow classes implement methods and objects to provide information on and control of workflows. A work list class implements methods and objects to provide information on and manipulate work items assigned to the workflows. A work item class implements methods and objects to provide information on and manipulate work items when executing one workflow.

In further implementations, methods in the workflow class are called to begin and terminate an instance of one workflow comprising nodes. Methods in the work list class are called to obtain information on the work items and nodes in one workflow. Further, methods are called in the work item class to enable a user to perform actions associated with one work item in one workflow, wherein at least one work item is associated with each node in the workflow.

In further implementations, a workflow notification class includes methods and objects to provide information on notifications associated with the workflows. One notification is generated if an action associated with a work item is not performed in a specified time period. Methods in the workflow notification class are called to obtain information on one notification and control a state of the notification.

Further provided is a workflow service class including methods and objects to provide information on workflows associated with one workflow service. One method in the workflow service class is called to obtain a list of all workflows associated with one workflow service.

Still further, a workflow object maintaining information on one workflow is instantiated. The methods of the workflow class obtain information and control the workflow through the variables in the workflow object representing the workflow. A work list object maintaining information on work items and nodes in one workflow is instantiated. The methods of the work list class obtain information on work items and nodes in one workflow. One work item object for each work item in one workflow is instantiated. The methods of the work item class obtain information on work items from the work item objects. One work list object identifies one or more work items represented by work item objects and wherein one workflow object is associated with one or more work items.

The described implementations provide a class architecture to provide access to information on workflows and to execute and implement the operation of the workflow.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
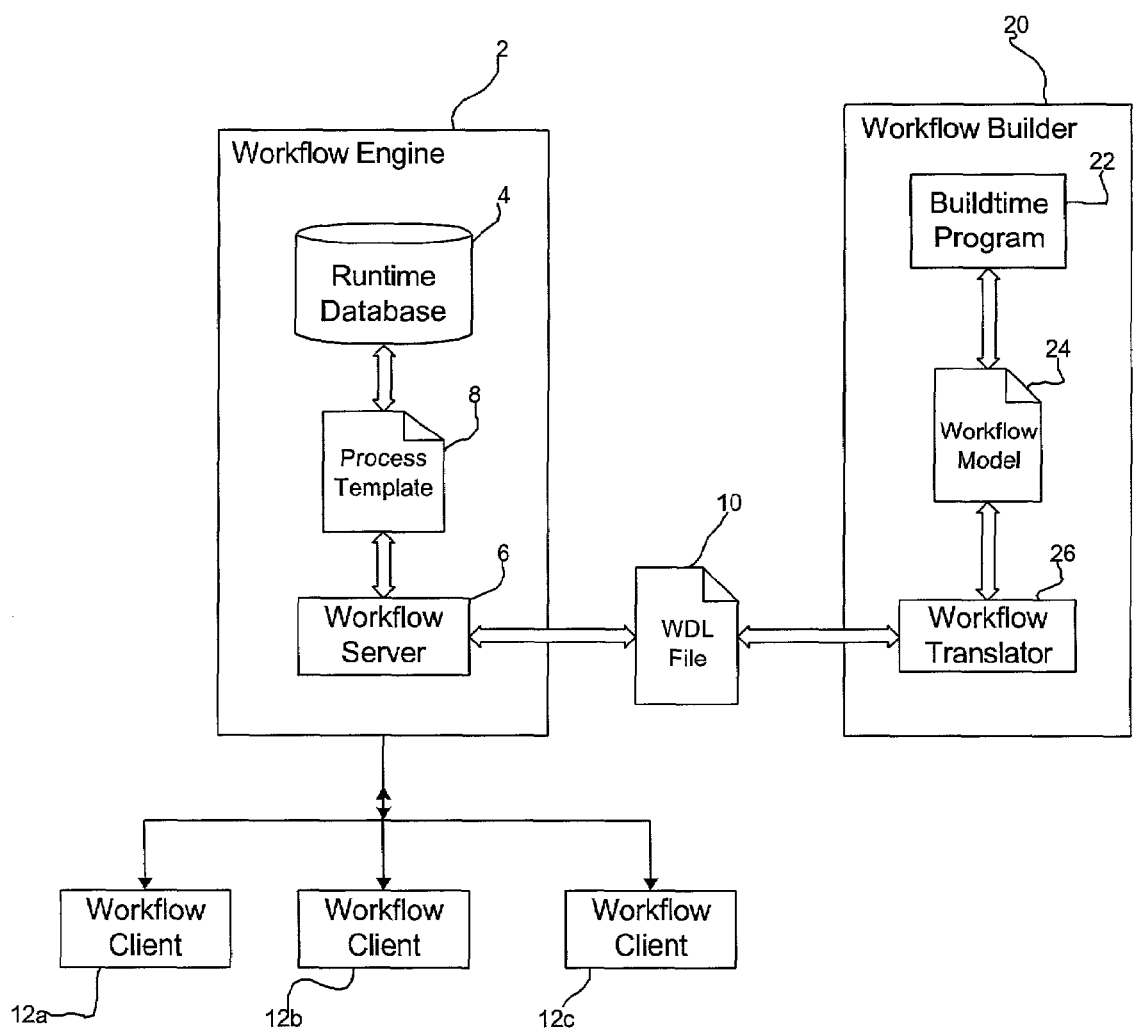
FIG. 1 illustrates a workflow computing environment in which aspects of the invention are implemented.

FIG. 1 illustrates a workflow environment implementation in which the invention is realized. A workflow engine 2 includes a runtime database 4 and a workflow server 6, such as the IBM MQSERIES Workflow server. The workflow server 6 is capable of transforming a workflow model coded in a workflow definition language (WDL) file 10, such as FDL, into a process template 8 implemented in the runtime database 4. The runtime database 4 stores database tables that implement the data structures that provide the status and setup information needed for workflow process execution. Whenever the state of a process activity changes, such information is recorded in the runtime database 4. The runtime database 4 may be implemented using any database program known in the art, such as IBM DB2.

**MQSeries, IBM, and DB2 are registered trademarks of International Business Machines Corp.

The workflow server 6 coordinates and manages the execution of processes for a defined process template 8. The workflow server 6 executes any programs associated with a process defined for the workflow, interprets the process definitions, creates process instances and manages their execution, manages processes and states, logs events, communicates with users as part of the workflow, etc. The workflow server 6 may include a database client program (not shown) to access and update records related to the workflow being processed maintained in the runtime database 4. The workflow server 6 processing may be distributed across multiple computers to achieve workload balancing.

The workflow clients 12a, b . . . n represent the client computers that execute workflow application program interfaces (APIs) to perform workflow related actions and activities and return messages to the workflow server 6. The workflow clients 12a, b . . . n thus comprise instances of the workflow code on the client computers that allow users to interface with the executing workflow and the workflow server 6. The workflow server 6 would execute activity programs as part of executing the workflow and transmit messages and data to the workflow client 12 to request user action to proceed with the workflow. The actions associated with the nodes and executed by the workflow server 6 may comprise Java servlets. The workflow client 12 may comprise a Web browser capable of executing Java scripts transferred from the Java servlet executing on the workflow server 6. Further, details on implementations and interactions of the workflow server 6 and client 12 are described in the IBM publication "IBM MQSeries Workflow: Concepts and Architecture, Version 3.3", IBM document no. GH12-6285-03 (March, 2001), which publication is incorporated herein by reference in its entirety.

A workflow builder 20 comprises a system including a buildtime program 22 that implements a plurality of graphical user interface (GUI) panels in which a user may define the components of a workflow model 24. A workflow translator 26 converts the workflow model 24, with the defined workflow components, into a workflow definition language (WDL) file 10 that implements the workflow model 24. The workflow definition language (WDL) may comprise the FlowMark Definition Language (FDL), Workflow Process Definition Language (WPDL) or any other workflow definition language known in the art that is used to define workflows. The workflow translator 24 would transfer the WDL file 10 to the workflow server 6 to transform into a process template 8 in the runtime database 4 in a manner known in the art.

The workflow engine 2, and each of the program components therein, such as the runtime database 4 and workflow server 6, may be implemented in one or more computing machines. The workflow clients 12 which provide the workflow interface to users may be implemented on one or more client machines. The workflow builder 20, including the buildtime program 22 and workflow translator 26 programs, may be implemented on one or more computing machines. Any portion of the workflow engine 2, workflow builder 20, and/or workflow client 12, and program components therein, may be implemented on the same computing machines or separate machines. The computing machines used to implement the workflow engine 2, workflow clients 12, and workflow builder 20 may comprise any computing device known in the art, such as a server, workstation, mainframe, personal computer, laptop computer, hand held computer, telephony device, etc.

As discussed, the buildtime program 22 generates a series of graphical user interface (GUI) panels through which the user may define a workflow. Before utilizing the buildtime program 22, the process modeler would plan the workflow and analyze the work the business performs, how it is performed, and by whom. The process modeler may then develop a workflow to generate a final product, which may comprise the result of the effort of a single business unit or the cumulative efforts of multiple users and units within an organization. To produce the final product, a workflow packet comprised of one or more documents would transfer through various user work stations in the company defined as nodes in the workflow to require the user associated with such node to handle and process and forward to another user to handle. A document is comprised of a multimedia item that has digital content.

For instance, an insurance company may have to process numerous documents related to an insurance claim, such as photographs, appraisals, expert reports, etc. Employees may spend a substantial amount of time sorting through documents and associating the documents with particular claims. In the workflow model, all the documents related to a single claim would be part of a work packet that may move through various user stations to review and process. The workflow would comprise the flow of work and actions that are performed on the documents or workflow packet by multiple users in the system.

The workflow defines the sequence and boundaries of how the work is performed with respect to the documents in the workflow packet, and any restrictions on the order in which documents in the workflow packet must be processed. For instance, before the claim can proceed to a further step, a claims adjuster might be required to ensure that certain documents are included in the workflow packet for the claim before the workflow packet can proceed to further nodes in the workflow, e.g., determining the amount of compensation.

In workflow terminology, a worklist is a queue of work items. Each work item comprises a unit of work for a node in the workflow that is performed by the users associated with that node. Each work item may be associated with one work packet, which comprises documents or objects that are processed during the work defined for that work item. When a user at one node accesses the work item to perform the work defined therein, that workitem is locked, thereby preventing others at that node from accessing the work item.

A worklist, which is a queue of work for the users of the organization to perform with respect to the workflow packet. The work items within the worklist can be handled by any of the employees/users assigned to the worklist. An action list defines the actions that a user can perform on the work packet objects associated with the work item, such as selections or data that may be entered in the work packet. For example, an adjuster in the claim process workflow can select an option to continue consideration of the claim if it appears valid or select an option to reject the claim. The workflow further consists of the paths defined as the connections between nodes which indicate the order of execution of nodes in the workflow.

Figure 2:
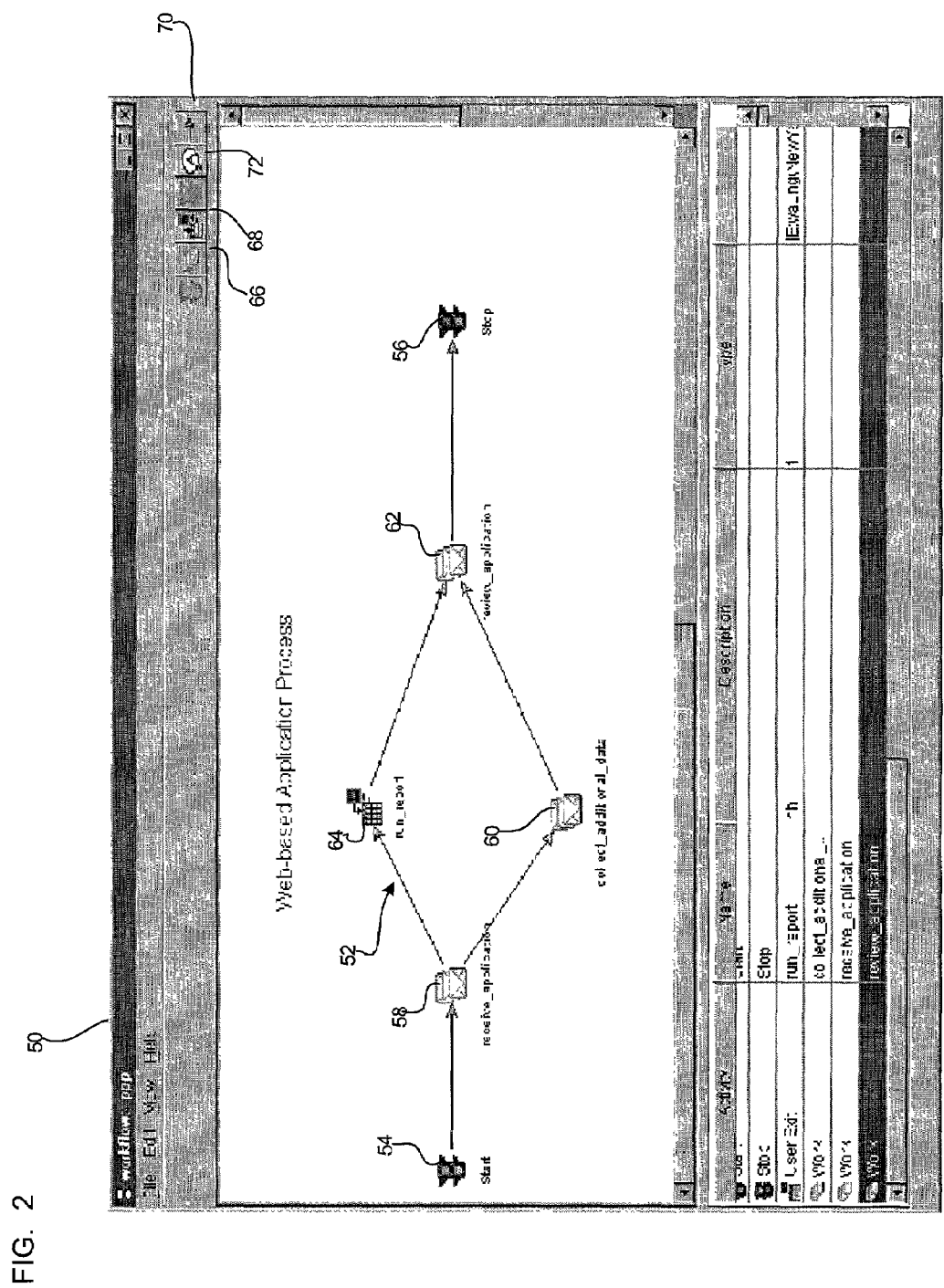
FIGS. 2–7 illustrate graphical user interface (GUI) panels used to design a workflow model in accordance with implementations of the invention.

FIG. 2 illustrates an example of a GUI panel 50 displayed by the buildtime program 22 illustrating a workflow 52 defined by a process modeler using workflow icons available in the GUI panel 50. The workflow 52 has a start icon 54, displayed as an icon having a green light, that indicates the start of the workflow and an end icon 56 is defined as indicating an end of the workflow. The start 54 and end 56 icons may be added automatically to the workflow 52 when the process modeler begins working on the workflow model 24. Between the start 54 and end 56 icons are a plurality of work nodes 58, 60, and 62, displayed as three stacked envelopes, that associate work items on the worklist and an action list for a specific point in a workflow 52. A work node 58, 60, 62 is a point in the workflow where work is performed. A user exit icon 64 indicates a user exit node where an application program is called to perform a background operation. Certain user exits may require that the called application program provide data to a work item in the workflow. Alternatively, the user exit may call an application program that may execute in the background, such as update a database, print reports, etc., while the workflow proceeds to further nodes.

As mentioned, the start 54 and end 56 icons may be automatically added to the workflow 52 when the user starts a blank workflow model 24. The user may move the start 54 and end 56 icons to any location on the drawing surface. The user may select the control icons 66 and 68 to add work and user exit nodes, respectively, to the workflow. Control icon 70 is used to define a path between two nodes defining the sequence in which the nodes are processed, and the order in which the work items are processed. The path lines, which are shown as the arrows between the start 54, end 56, work and user exit icons 58, 60, 62, and 64 illustrate the operation flow from one node to another.

Once the process modeler has defined the general layout of a workflow using the control icons 66, 68, 70, and 72, as shown in the workflow 52 in FIG. 2, the process modeler may then use additional GUI panels shown in FIGS. 3–7 of the buildtime program 22 to associate particular users, actions and work items with the nodes.

Figure 3:
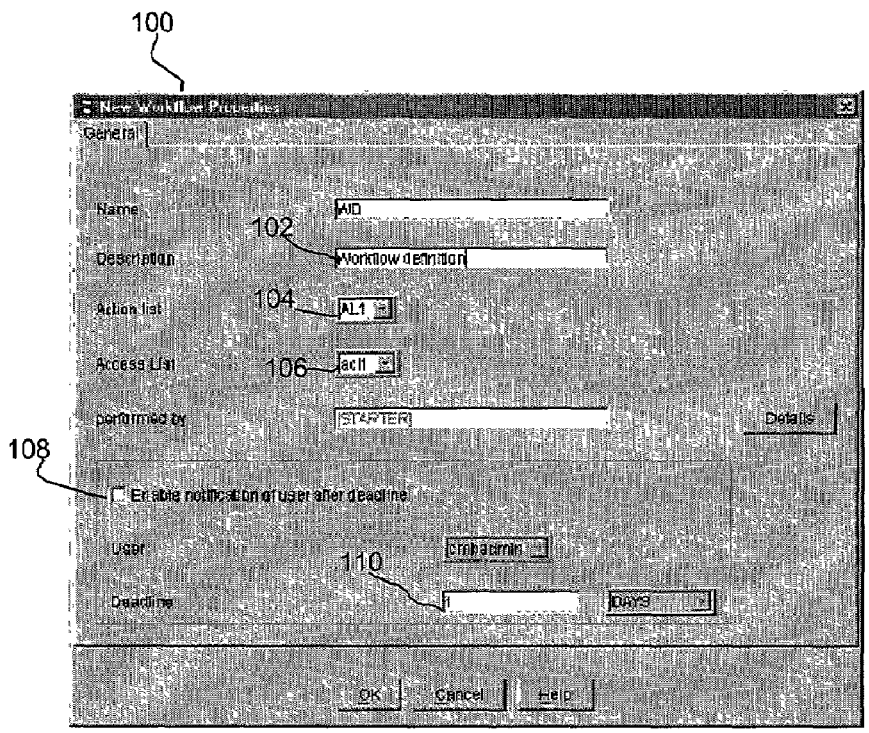

FIG. 3 illustrates a GUI panel 100 used to define properties for a new workflow being defined in the panel 50 of FIG. 1. A description field 102 includes a description of the workflow being defined. An action list 104 is a list of the actions that can be invoked at the nodes in the defined workflow. The actions may comprise programs that are executed at a particular node. In certain implementations, the actions comprise Java methods that the workflow server 6 executes when control proceeds to the node with which the method is associated. The program modeler would associate the actions in the action list with particular nodes. An access list 106 defines a mapping of users that can be assigned to nodes to perform the action associated with such node. Selection of the enable notification checkbox 108 causes a message to be sent to a specified user if the user associated with a node has not performed the action defined for the node within a specified time frame indicated in the deadline field 110.

Figure 4:
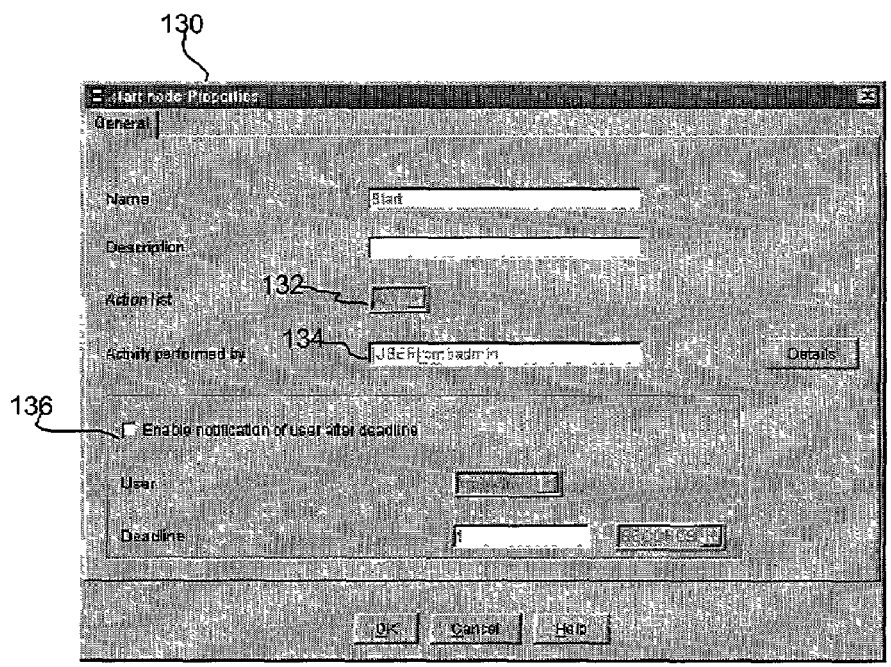

After defining the properties for the new workflow and placing icons in the drawing area and path arrows to define the workflow, the user would then use the GUI panels shown in FIGS. 4–7 to associate actions and a user with each node, where the associated user performs the associated action when the workflow server 6 processes the node according to the workflow. FIG. 4 illustrates a start node panel 130 in which the process modeler defines the action and user associated with the start node 54 in the workflow, i.e., the first user that will perform the action with respect to the item at the beginning of the workflow. The process modeler would select an action from the action list in the action field 132 and specify the user to perform the action at the start node in the user field 134. The enable notification of deadline checkbox 136 may be selected to notify the user associated with the start node that a deadline has passed during which the user designated action for that node was not completed. Anyone, such as an administrator, user associated with node, or other user on the access list may receive the notification of the missed deadline for the start node 54.

Figure 5:
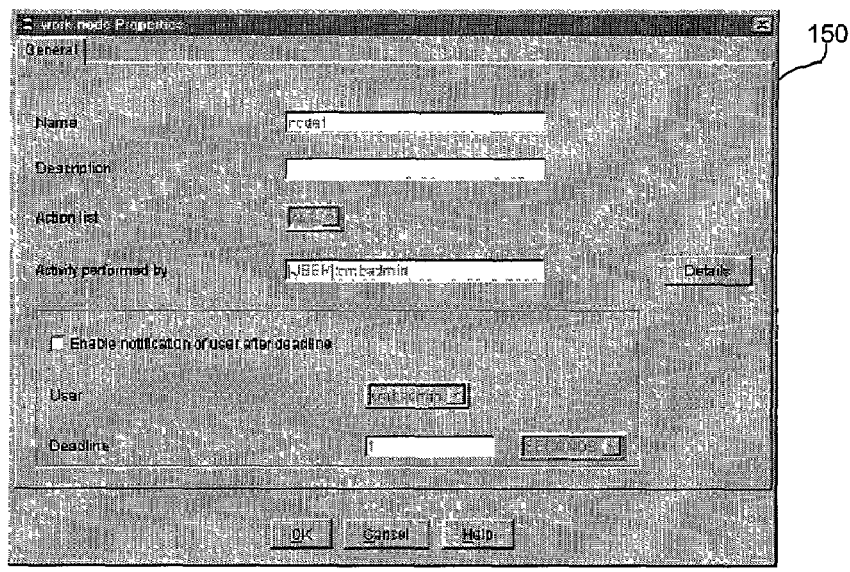

FIG. 5 illustrates the property GUI panel 150 used to associate one or more actions and a user with one of the work nodes in the workflow, such as work nodes 58, 60, and 62 in FIG. 2. The work nodes defined by the user may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary if the claim adjuster selects to reject the claim as opposed to approving the claim. A collection point node is a work node where certain documentation is gathered and added to the work packet. The collection node holds and manages work packages that cannot be processed completely until additional information is received. A document node represents a document in the workflow.

Figure 6:
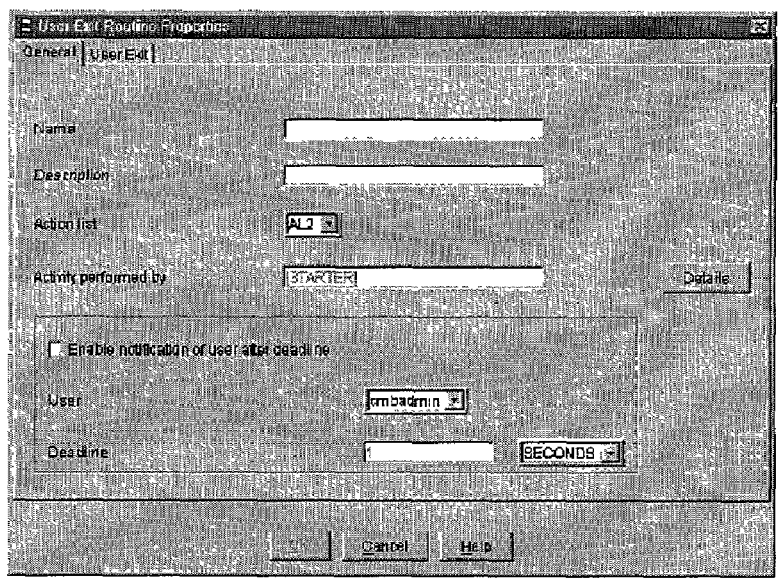
Figure 7:
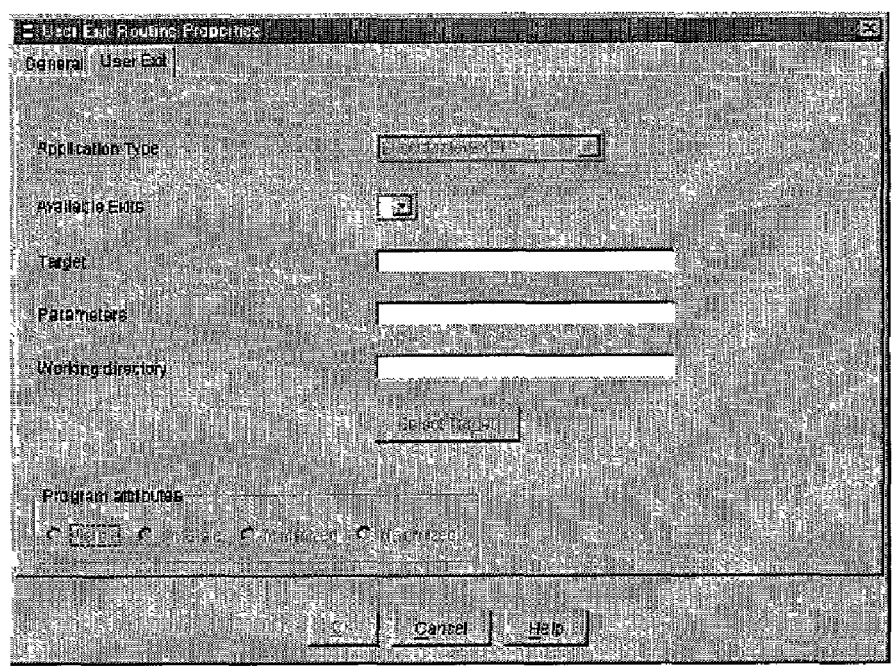

FIGS. 6 and 7 illustrates the property panels used to define a user exit node that calls an external application to perform operations and perhaps transfer data back to the node for further processing. A user exit is a point in the workflow execution where a user exit routine can be given control, and transfer data back and forth from the external application to the node upon the occurrence of a user-specified event. Further, the user exit node may call an external application program to perform background operations while the workflow proceeds to the next work node.

Using all the above described panels shown in FIGS. 2–7, the process modeler can design a workflow model specifying work nodes and the actions associated with the work nodes, as well as the paths between the work nodes. If two paths lead into a node, such as the case with work node 62 in FIG. 2, then the workflow will only proceed to the action specified for that next node once the actions associated with the two preceding nodes has completed. Before the user may use the buildtime program 22, the user must define the access control lists, users, user groups, actions, action lists and worklist in a manner known in the art using application programming interfaces (APIs). The worklist would provide those work items assigned to users, indicating the work items a user may access when performing actions at a node.

Figure 8:
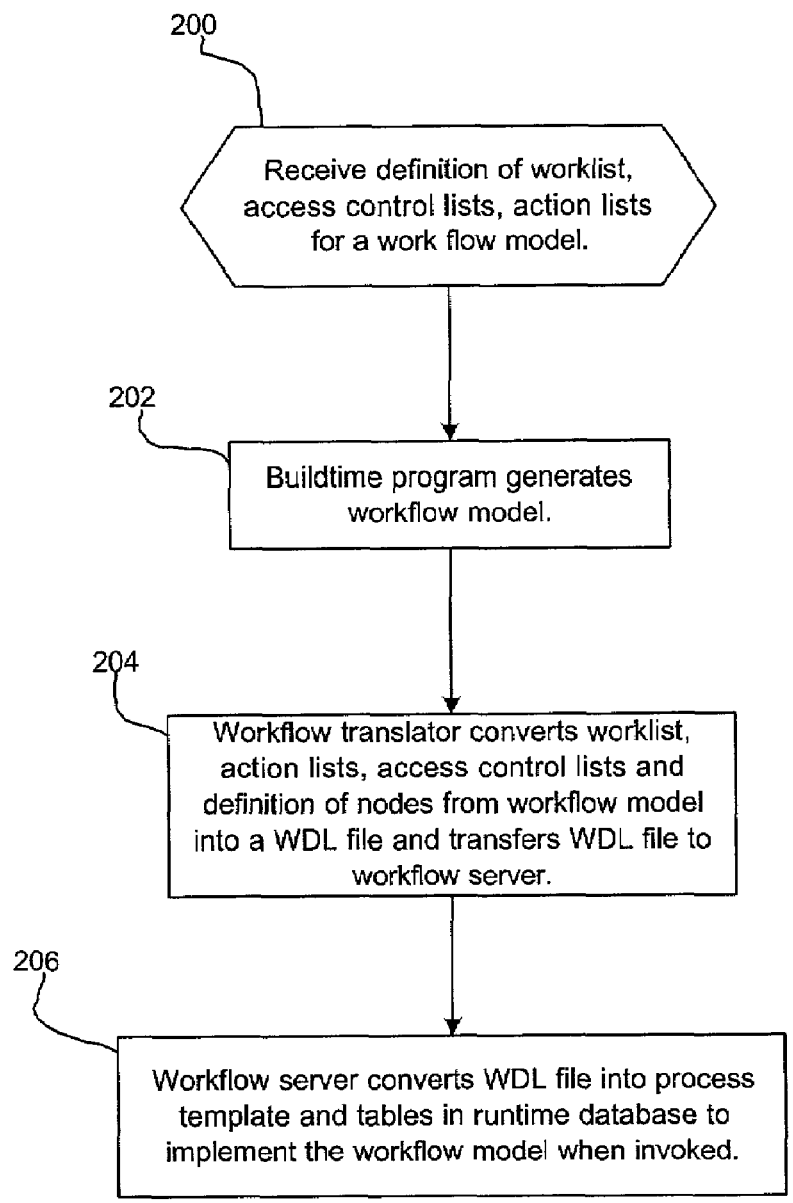
FIG. 8 illustrates logic implemented in a buildtime program to generate a workflow model and workflow definition language (WDL) file in accordance with implementations of the invention.

FIG. 8 illustrates logic implemented in the workflow builder 20 and workflow engine 2 to generate a workflow in the runtime database 4 that may be invoked and executed. Control begins at block 200 with the buildtime program 22 receiving defined work lists, access control lists, and action lists. The buildtime program 22 and GUI panels therein are then used to generate (at block 202) a workflow model 24 including a plurality of nodes, such as shown in FIG. 2, and paths therebetween defining the order of execution of the nodes in the workflow. At block 204, the workflow translator 26 converts the workflow model 24 and the defined workflow, access lists, action lists, etc. into a WDL file coded using a workflow definition language known in the art and transfers the WDL file 10 to the workflow server 6. The workflow server 6 then builds the process template 8, including tables and other data structures, in the runtime database 4 that are used to implement the workflow model defined using the buildtime program 22.

Figure 9:
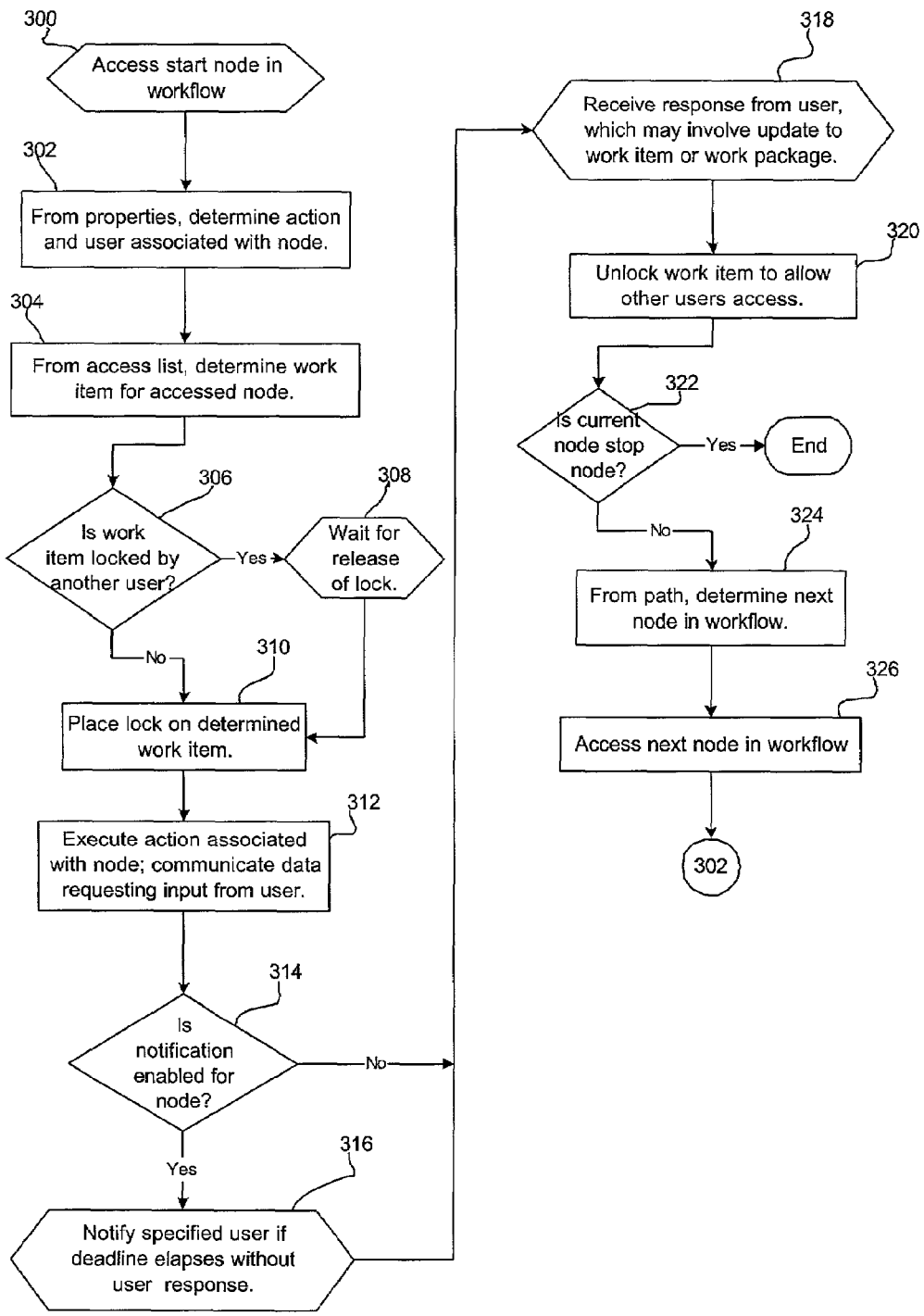
FIG. 9 illustrates logic performed by a workflow server to execute a workflow in accordance with implementations of the invention.

In certain implementations, the workflow model 24 defined using the buildtime program 22 is document centric in that the actions performed at the node concern the processing of work packages that may comprise any content or object that is processed and routed through the workflow. FIG. 9 illustrates the logic performed by the workflow server 6 to execute the workflow logic generated using the buildtime program 22 GUI panel 50 shown in FIG. 2. When a user invokes a workflow stored in the runtime database 4, the workflow server 6 accesses (at block 300) the start node of the invoked workflow by interacting with the runtime database 4 in a manner known in the art. From the properties defined for that node, the workflow server 6 determines (at block 302) the actions and user associated with the node. The workflow server 6 further processes (at block 304) the access list defined for the workflow to determine the work item for the accessed node. If (at block 306) the determined work item currently accessed in the workflow is locked by another user at that node, then the workflow server 6 waits (at block 308) for the lock on the work item(s) to be released. If the work item is not locked or after the lock is released, control proceeds to block 310 where the workflow server 6 places a lock on the determined work item. The workflow server 6 then executes (at block 312) the action associated with the node and communicates data to the workflow client 12 of the determined user requesting user action.

If (at block 314) notification is enabled for the current node and the deadline has passed (at block 316) without receiving a response from the user, then the workflow server 6 notifies the user specified with the enable notification that the deadline has passed. Upon receiving (at block 318) a response from the user, which may comprise entering information, modifying a work item, adding a work item to the work package, selecting an option, etc., the workflow server 6 unlocks (at block 320) the work item(s) previously locked for the user. If (at block 322) the current node is the stop node, then control ends; otherwise, if there are further nodes to process in the workflow, then the workflow server 6 determines (at block 324) from the path from the current node the next node in the workflow and accesses (at block 326) the next node. Control then proceeds back to block 326 to process the next node.

The workflow logic of FIG. 9 provides a document centric workflow in that the state of processing work items associated with the node controls the workflow because control cannot proceed to other subsequent nodes that process the locked work item until the node holding the lock completes execution and releases the lock on the work item. Thus, access to work items controls the flow through the workflow. The workflow builder 20 provides a GUI tool to allow the user to create a document centric workflow model and translate that workflow model 24, including the defined worklists, access lists, action lists, etc., into a workflow definition language (WDL) file 10 that can be maintained and utilized in a robust workflow engine software product known in the art.

With the described implementations, the workflow builder 20 generates a WDL file 10 that may be compatible with workflow engines from different vendors because different vendors may design their workflow engines to be compatible with the WDL format of the WDL file 10. This allows the workflow model defined in the WDL file 10 to be transportable across different vendor workflow engine platforms.

Object Oriented Workflow Architecture

Figure 10:
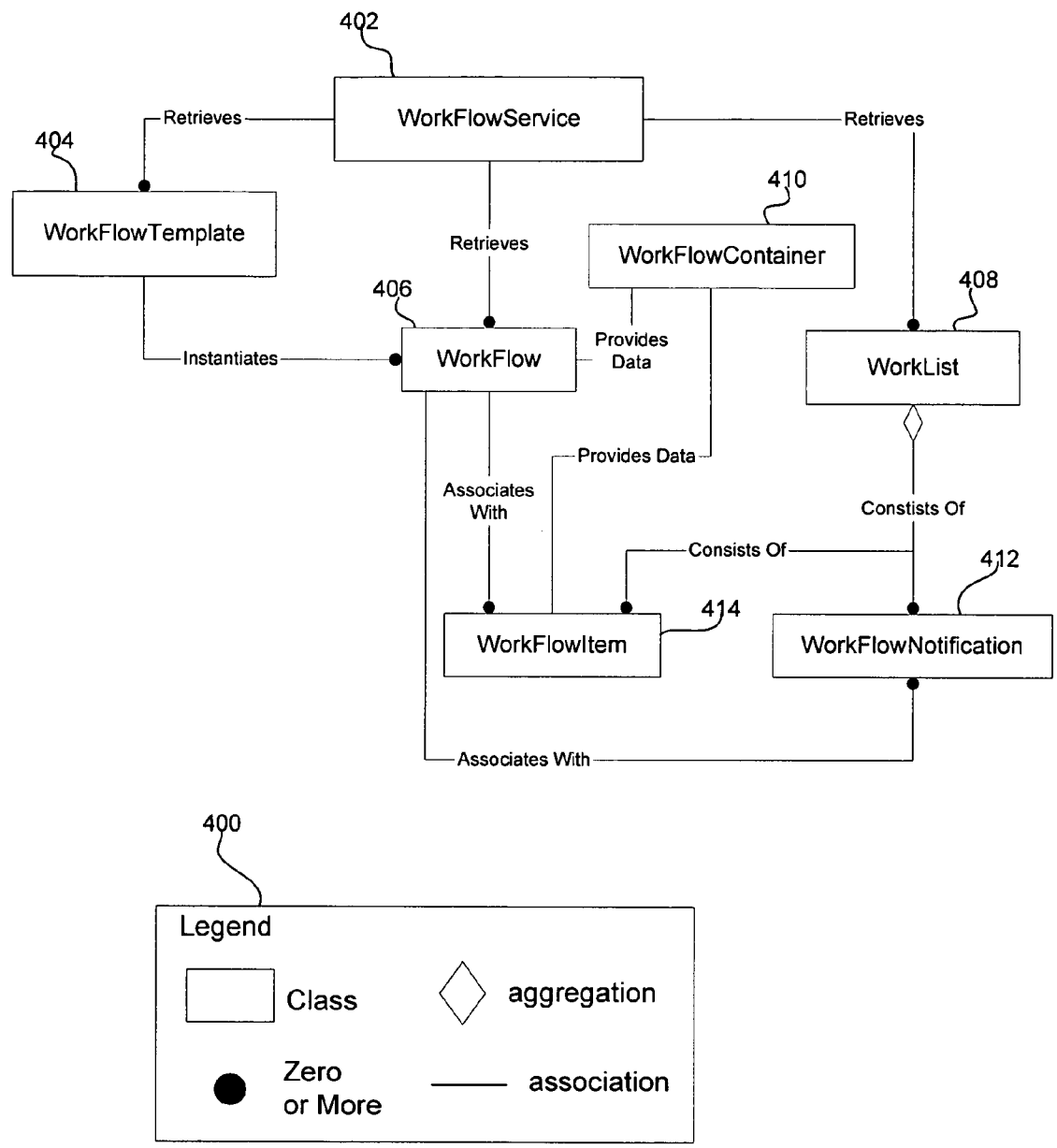
FIG. 10 illustrates an architecture of object oriented classes for implementing a workflow.

FIG. 10 illustrates an architecture of object oriented classes and their interrelationship that are used to implement a workflow of nodes. As indicated in the legend 400, a rectangle indicates a class; a line connecting classes indicates an association of the connected classes; a line connecting classes terminating in a filled circle indicates that there may be one or more instances of the class at the end with the circle for each instance of the class at the other end of the line; and a line terminating at a diamond indicates that the class at the diamond end is an aggregate, such that the aggregate object is made up of one or more instances of the class at the other end of the line. FIG. 10 illustrates the relationship of the classes.

The WorkFlowService class 402 is the starting point for a user wanting to access a workflow. The WorkFlowService class 402 includes methods that allow users to access already defined workflow templates and executing workflows. The WorkFlowService class 402 is associated with the WorkFlowTemplate 404, WorkFlow 406, and WorkFlowList 408 classes. The WorkFlowTemplate class 404 provides methods that allow the user to manipulate workflow process template objects, e.g., process template 8 (FIG. 1), which comprise a defined workflow that is stored in the workflow engine 2. The WorkFlow class 406 provides methods that allow the user to access information and control an executing workflow. The WorkList class 408 includes methods that allow the user to access an executing work list object comprised of work items and information on the current state of the executing work list, i.e., information on work items being processed. The methods in the WorkFlowService class 402 are used to retrieve information on particular workflows, workflow templates, and workflow lists associated with a particular workflow service. The methods from the other classes, such as the WorkFlowTemplate 404, WorkFlow 406, and WorkFlowList 408 classes, can then be used to obtain specific information and control over those workflow templates, workflows, and workflow lists identified by the WorkFlowService class 402 methods.

The WorkFlowTemplate class 404 provides information on a workflow template. A workflow object from the WorkFlow class 406 represents an executing workflow. The WorkFlowContainer class 410 includes methods to instantiate a container object that includes information on one container used to transfer data between nodes. Users at nodes may access data in the container and update the container with additional data. The data in the container may be used by the action being executed at a node. The WorkFlow class 406 is associated with the WorkFlowNotification class 412, which is used to provide notifications, such as notifications if a user does not perform an action at a node within a predefined time period. There may be many notifications provided for one workflow. The WorkFlow class 406 is further associated with the WorkFlowItem class 414, such that one executing workflow may be associated with one or more work items indicating a unit of work to perform for a node within the workflow.

The WorkFlowItem class 414 is associated with the WorkFlowContainer class 410, such that one container may be used at a work item to provide data to the user executing the unit of work defined by the work item. The relationship between the WorkFlow class 406 and the WorkFlowItem class 414 indicates that there may be many work item objects associated with one executing workflow. The class architecture of FIG. 10 further illustrates that a workflow list of the WorkFlowList class 408 is an aggregate of the workflow from the WorkFlow 414 Item class and workflow notifications from the WorkFlowNotification 412 class.

The above object oriented architecture of FIG. 10 defines how the different classes interrelate in order to implement a workflow. Each of the above interrelated classes 402, 404, 406, 408, 410, 412, and 414 provides interfaces/methods that may be used within a workflow computer program to implement the workflow and actions performed at a node. The workflow program would be executed by the workflow server 6 (FIG. 1) in the workflow engine 2.

Following are examples of some methods of the WorkFlowService class 402, including:
  WorkFlowService( ): constructs a new workflow service, which provides access to different workflow services in the workflow engine 2 (FIG. 1). Each workflow service is associated with workflow templates, executing workflows, and workflow lists of work items for a workflow.
  connect: provides a user name, authentication, and connection string to use to authenticate a user to provide access to a requested workflow service, which allows access to workflow templates, work lists, etc.
  connection: handle returned to a user to allow access to a particular workflow service.
  setDatastore: a reference to a data store including documents and objects used by the work items in the workflows associated with the workflow service. Thus, different workflows for a workflow service may process documents within workflow packages from the same data store.
  listWorkFlows: returns a list of all workflow objects of the WorkFlow class 406.
  listWorkLists: returns a list of all work list objects of the WorkFlowList class 408.
  listWorkFlowTemplates: returns a list of all template objects of the WorkFlowTemplate class 404.

Following are examples of some methods of the WorkFlowService class 402, including:
  WorkFlowTemplate(): constructs a workflow template object including a defined workflow. This workflow template may be created using the GUI panels and buildtime program described above.
  name: returns name of a workflow template.
  description: returns a description of the work performed by a workflow template.
  modifiedTime: time the workflow template was last modified.

Following are examples of some methods of the WorkFlow class 406, including:
  WorkFlow(): constructs a workflow object representing a workflow comprised of nodes and work items for a specified workflow. The workflow may also be provided a container that is used to allow users of different work items to communicate and/or a work packet comprised of one or more documents or objects to be processed as part of the workflow.
  get/setName: returns or sets the name for a workflow.
  workFlowTemplateName: returns the name of the workflow template associated with the workflow.
  notificationTime: returns the time of the last notification generated for the workflow in response to a user not performing an action for one accessed node within a specified time period.
  modifiedTime: Returns the last time the workflow was modified.
  stateChangeTime: returns the last time a state change occurred with the workflow:
  startTime: returns the time the workflow was started.
  endTime: returns the time the workflow ended.
  state: returns a state of the workflow, such as ready, running, finished, terminated, suspended, terminating, suspending, deleted, etc.
  inContainer: returns the input container associated with the workflow.
  start: starts a workflow with a container if the state is ready.
  terminate: terminates the workflow if the state is running, suspended, or suspending.
  suspend: suspends the workflow if the state is running.
  resume: resumes a suspended workflow if the state is suspended and suspending.
  add: adds a workflow to the system that is associated with one specified workflow template.

Following are examples of methods of the WorkFlowContainer class 410, which instantiates a container object used with a workflow to transport information among the nodes.
  WorkFlowContainer(): constructs a container object for a container used within a particular workflow.
  get/setPriority: get/sets the priority for an item in the container.
  get/setActivityNode: get/sets the current node being processed, may also get/set information on the current activity node.
  get/setWorkPacketID: get/sets an identifier of a work packet being routed through the system.
  get/setActionPerformed: get/sets information on an action being performed.
  get/setUserVariable: get/sets a variable maintained in the container, that may have predefined values. The priority is maintained for a user variable in the container.
  retrieve: retrieves and refreshes the container.
  update: updates the container data.

Following are examples of some methods of the WorkList class 408, where a work list object is a representation of a work list in the system. As discussed, a work list object comprises a collection of work items and notifications for an executing workflow.

WorkList(): constructs a work list object for a specified work list. A work list consists of work items.

get/set ACLName: get/sets the action control list (ACL) name for the work list including the actions that may be performed as part of units of work for the work list.

listWorkItems: lists the work items on the work list.

listWorkItemsByTemplate: returns the work items for the work list by the specified workflow template name.

listWorkItemsByNode: returns a list of the work items assigned to each node in the work flow.

listProcessNotifications: lists notifications generated during workflow that are associated with the workflow process. For instance, the notification enabled through the GUI in FIG. 3 provides a general notification for the workflow. In certain implementations, a notification process is activated and performed as a background process to generate notifications.

listActivityNotifications: lists notifications generated during workflow that are associated with a particular activity, such as a user not performing an activity within a specified time. For instance, the notification enabled through the GUI of FIGS. 4 and 5 enables notifications for activities at particular nodes.

add/update/delete/retrieve: separate commands that allow user to add, update, delete, and retrieve a work list.

Additional commands may be provided to access the information in the work list, such as filter commands to provide filters for accessing information from the work list, thresholds of the number of items that can be in the work list, etc.

Following are examples of some methods of the WorkFlowItem class 414, where a work item object represents a unit of work performed in the workflow. The following methods are used to create and modify work items, and obtain information thereon.

WorkFlowItem(): constructs a work item for a specified workflow, node, and owner.

name: returns the name of the node to which the work item is assigned.

state: returns a state of the work item, such as not set, ready, running, finished, terminated, suspended, disabled, checked out, in error, executed, etc. A work item is checked out when a user has accessed the work item to perform the actions defined for the work item.

workFlowName: returns the name of the workflow including the work item.

workFlowTemplateName: returns the name of the workflow template including the work item.

priority owner, notificationTime, startTime creationTime, modifiedTime: methods that return information on the priority, owner, time of last notification, time of creation and time of last modification for a work item, respectively.

retrieve, start finish: methods used to retrieve, begin executing, and complete a work item, respectively.

checkIn, checkOut: checkOut locks a work item to prevent other users at a node from accessing the work item and changes the state of the work item to checked out. Upon check out, the container associated with the work item is accessed from the previous node using the inContainer method. The checkIn method receives the completed work item from the user, releases the lock, and provides the container to route to the next node.

inContainer: method that obtains container from previous node for use with work item checked out at current node being processed.

outContainer: method generates an out container to include contents of container user accessed at work item, including any changes made by the user to the data in the container. A handle of the out container is generated and provided with checkOut method called for the next node to provide that container to the user of the next node in the workflow.

Following are examples of some methods of the WorkFlowNotification class 412, where a notification object represents a generated notification. The following methods are used to create and modify notifications, and obtain information thereon.

WorkFlowNotification(): constructs a notification object having a specified notification name, notification type, and owner name for a specified workflow service and workflow. The notification type indicates how the owner is notified.

state: returns a state of the notification, such as not set, ready, running, finished, terminated, suspended, disabled, etc.

priority, owner, notificationTime, startTime, creationTime, modifiedTime, receivedTime: these methods return the priority of the notification, owner of the notification, time that must elapse before the notification is generated, time the notification started, time the notification was crated, time of last notification to the notification, time the notification was received, respectively. The notification would be started and executed as a background process.

receiveReason: returns a received reason for the notification.

retrieve, cancel: methods that retrieve and cancel a notification, respectively.

transfer: transfers a notification to a specified user. In this way, a notification can be transferred from the current owner to some other user.

The above described methods and classes would be included in a workflow program executed by the workflow server 6 (FIG. 1) to execute the workflow. The methods described above would be used to access and modify the workflow related objects, such as the workflow, work items, notifications, containers, etc. when running the workflow. The above described methods may also be used in other programs that can obtain information and status on a workflow.

Figure 11:
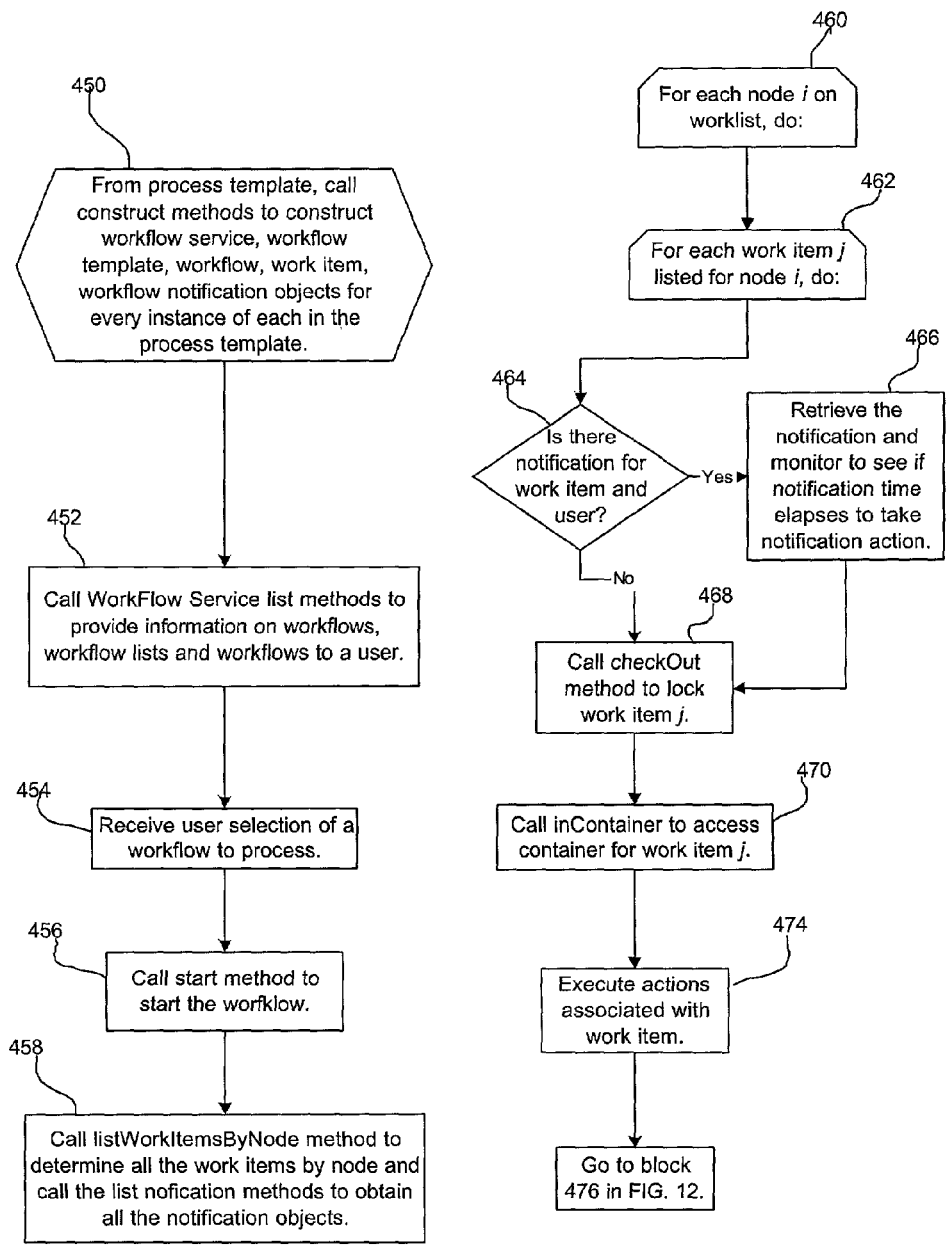
FIGS. 11 and 12 illustrate logic to utilize the methods and objects from the object oriented class architecture of FIG. 10 to execute a workflow.
Figure 12:
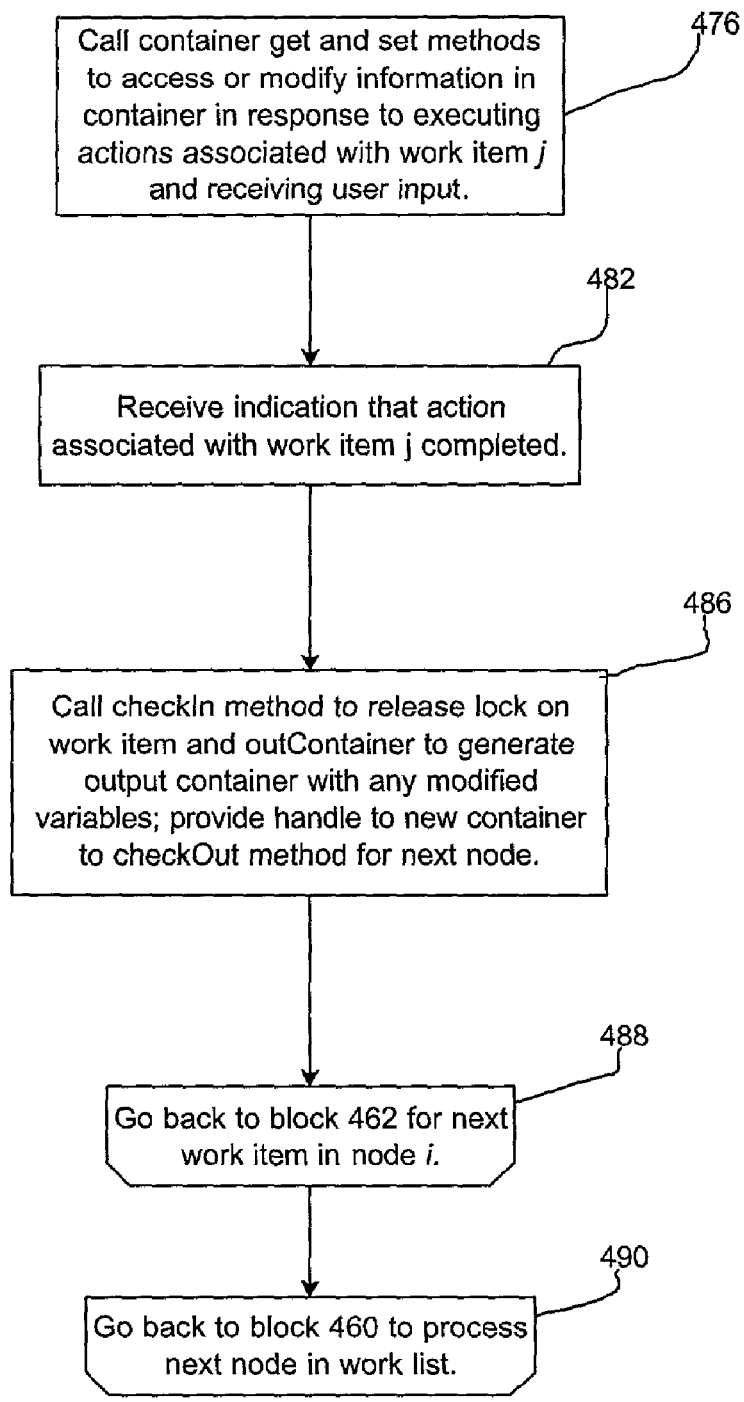

FIGS. 11–12 illustrate an example of program logic in a workflow program executed by the workflow server 6 (FIG. 1) utilizing the above discussed methods to implement a workflow. With respect to FIG. 11, control begins at block 450 where the program calls the constructor methods, WorkFlowService() to construct a workflow service object. The workflow program would then call (at block 452) the WorkFlowService list methods, such as listWorkFlows, listWorkLists, listWorkFlowTemplates, to obtain information on the workflows, workflow templates, and work lists for a workflow service. This information may then be presented to a user for selection. Various other methods in the classes may be called to access information on the workflow to present to the user when making a decision on which workflow to execute.

At block 454, user selection of a workflow to process is received. The workflow program then calls (at block 456) the WorkFlow start method to start the workflow. The workflow program then calls (at block 458) the listWorkItemsByNode method to obtain all the work items for the started workflow, and the nodes to which the one or more items are associated. The workflow program then performs a loop at blocks 460 through 490 for each node i in the workflow, as determined from the list of work items by node. For each node i, the workflow program performs a loop at block 462 to 488 for each work item j associated with node i. If (at block 464) there is a notification for the work item and the user that is the owner of the item, as determined from the methods, then the workflow program retrieves (at block 466) retrieves the notification and then starts a monitor to determine if the time period for the notification has elapsed without the work item completing. From block 464 or 466, the workflow program calls (at block 468) the checkOut method to lock the work item j. The inContainer method is called (at block 470) to access any container associated with the work item j. Once the work item j is locked, the workflow program then executes (at block 474) the actions associated with the work item j.

Control then proceeds to block 476 in FIG. 12, where the workflow program calls container get and set methods to access or modify the data and variables in the container accessed for the work item j in response to executing actions assigned to that work item j. For instance, as part of performing actions for a work item, the user of the work item may read and write data to the container. The workflow program receives (at block 482) indication from a user that the actions associated with the work item have completed. The workflow program further calls (at block 486) the checkIn method to release the lock on the work item j and the outContainer method to generate a new container including any updates to provide to the user at the next node in the workflow. The handle to the new container would be used in the next called checkOut method to provide the container to the user at the next node of the workflow. If there are further work items for the node i, then control proceeds (at block 488) back to block 452 to retrieve the next work item. After completing all the work items for node i, control proceeds (at block 490) back to block 460 to process the next node in the work list.

The above described logic utilized workflow related classes and the methods therein to implement a workflow and obtain information thereon. The workflow server 6, or some other component in the workflow engine 2 (FIG. 1), would then translate the workflow objects and methods into application specific commands, such as Structured Query Language (SQL) commands to manipulate the data in the runtime database 4 and process template 8 to obtain information on the workflow and implement workflow operations.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The workflow client and server may be implemented within any vendor workflow program known in the art.

In the described implementations, the actions were implemented as Java methods. Alternatively, the actions may be implemented in any programming language known in the art.

In the described implementations, particular icons were used to represent different information in the workflow, such as work nodes, exit nodes, etc. However, any icon design may be used to represent the workflow components. Further, additional graphical representations may be provided for different types of work nodes, e.g., collection work nodes, assign value node, decision point node, etc.

In the described implementations, the class architecture is implemented as an object oriented class architecture. Alternatively, non-object oriented programming techniques may be used to implement the described class architecture.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for executing a workflow, comprising:

providing a workflow class implementing methods and objects to provide information on and control of workflows;

providing a work list class implementing methods and objects to provide information on and manipulate work items assigned to the workflows;

providing a work item class implementing methods and objects to provide information on and manipulate work items when executing one workflow;

providing a container class implementing methods and objects to provide information and control containers provided for the workflows, wherein a container comprises an object that is used to transfer information among nodes by enabling users to read and write data to the container;

calling one method in the work list class to determine nodes and associated work items in the workflow to process;

calling one method in the work item class to lock a work item when providing a user access to workflow actions and documents associated with the work item; and calling one method in the work item class to unlock the work item after the user has completed all actions associated with the work item.

2. The method of claim 1, further comprising:
calling methods in the workflow class to begin and terminate an instance of one workflow comprising nodes;
calling methods in the work list class to obtain information on the work items and nodes in one workflow; and
calling the methods in the work item class to enable a user to perform actions associated with one work item in one workflow, wherein at least one work item is associated with each node in the workflow.

3. The method of claim 1, further comprising:
providing a workflow notification class including methods and objects to provide information on notifications associated with the workflows, wherein one notification is generated if an action associated with one work item is not performed in a specified time period; and
calling methods in the workflow notification class to obtain information on one notification and control a state of the notification.

4. The method of claim 1, further comprising:
providing a workflow service class including methods and objects to provide information on workflows associated with one workflow service; and
calling one method in the workflow service class to obtain a list of all workflows associated with one workflow service.

5. The method of claim 1, further comprising:
calling the methods in the container class to read and write data to the container for at least one user of one work item.

6. The method of claim 5, further comprising:
calling methods in the work item class to make one container associated with one work item available to one user of one work item; and
calling one method in the work item class to enable one user of one work item at a next node in the workflow access to the container.

7. The method of claim 1, further comprising:
instantiating a workflow object maintaining information on one workflow, wherein the methods of the workflow class obtain information and control the workflow through variables in the workflow object representing the workflow;
instantiating a work list object maintaining information on work items and nodes in one workflow, wherein the methods of the work list class obtain information on work items and nodes in one workflow; and
instantiating one work item object for each work item in one workflow, wherein the methods of the work item class obtain information on work items from the work item objects, wherein one work list object identifies one or more work items represented by work item objects and wherein one workflow object is associated with one or more work items.

8. The method of claim 7, further comprising:
providing a workflow service class including methods and objects to provide information on workflows associated with one workflow service; and
instantiating a workflow service object maintaining information on workflows and work lists for the workflows associated with one workflow service, wherein the methods of the workflow service class obtain information on workflows and work lists from the workflow service object.

9. The method of claim 8, wherein the workflow service object includes information on associated workflow templates, wherein each instance of an executing workflow is instantiated from one workflow template, further comprising:
providing a workflow template class including methods and objects to provide information on one workflow template associated with one workflow service; and
instantiating a workflow template object maintaining information on one workflow template, wherein one or more workflow objects are associated with one workflow template object.

10. The method of claim 9, wherein the workflow service object includes information on one or more associated workflow templates, and wherein one method of the workflow service class is called to obtain information on the one or more workflow templates associated with the workflow service.

11. The method of claim 7, further comprising:
providing a workflow notification class including methods and objects to provide information on notifications associated with one workflow that generate a notification if an action associated with one work item is not performed in a specified time period; and
instantiating one workflow notification object maintaining information on one workflow notification, wherein one or more workflow notifications are associated with one workflow and wherein one work list includes one or more workflow notifications.

12. The method of claim 7, further comprising:
instantiating one container object maintaining information on one container used in the workflow, wherein one container object is associated with one workflow object and one work item.

13. The method of claim 1, wherein the classes comprise object oriented classes.

14. A computer system for executing a workflow, comprising:
means for providing a workflow class implementing methods and objects to provide information on and control of workflows;
means for providing a work list class implementing methods and objects to provide information on and manipulate work items assigned to the workflows;
means for providing a work item class implementing methods and objects to provide information on and manipulate work items when executing one workflow;
means for providing a container class including methods and objects to provide information and control containers provided for workflows, wherein a container comprises an object that is used to transfer information among nodes by enabling users to read and write data to the container;
means for calling one method in the work list class to determine nodes and associated work items in the workflow process;
means for calling one method in the work item class to lock a work item when providing a user access to workflow actions and documents associated with the work item; and
means for calling one method in the work item class to unlock the work item after the user has completed all actions associated with the work item.

15. The system of claim 14, further comprising:
means for calling methods in the workflow class to begin and terminate an instance of one workflow comprising nodes;

means for calling methods in the work list class to obtain information on the work items and nodes in one workflow; and means for calling the methods in the work item class to enable a user to perform actions associated with one work item in one workflow, wherein at least one work item is associated with each node in the workflow.

16. The system of claim 14, further comprising:

means for providing a workflow notification class including methods and objects to provide information on notifications associated with the workflows, wherein one notification is generated if an action associated with one work item is not performed in a specified time period; and means for calling methods in the workflow notification class to obtain information on one notification and control a state of the notification.

17. The system of claim 14, further comprising:

means for providing a workflow service class including methods and objects to provide information on workflows associated with one workflow service; and means for calling one method in the workflow service class to obtain a list of all workflows associated with one workflow service.

18. The system of claim 14, further comprising:

means for calling the methods in the container class to read and write data to the container for at least one user of one work item.

19. The system of claim 18, further comprising:

means for calling methods in the work item class to make one container associated with one work item available to one user of one work item; and means for calling one method in the work item class to enable one user of one work item at a next node in the workflow access to the container.

20. The system of claim 14, further comprising:

means for instantiating a workflow object maintaining information on one workflow, wherein the methods of the workflow class obtain information and control the workflow through variables in the workflow object representing the workflow;

means for instantiating a work list object maintaining information on work items and nodes in one workflow, wherein the methods of the work list class obtain information on work items and nodes in one workflow; and means for instantiating one work item object for each work item in one workflow, wherein the methods of the work item class obtain information on work items from the work item objects, wherein one work list object identifies one or more work items represented by work item objects and wherein one workflow object is associated with one or more work items.

21. The system of claim 20, further comprising:

means for providing a workflow service class including methods and objects to provide information on workflows associated with one workflow service; and means for instantiating a workflow service object maintaining information on workflows and work lists for the workflows associated with one workflow service, wherein the methods of the workflow service obtain information on workflows and work lists from the workflow service object.

22. The system of claim 21, wherein the workflow service object includes information on associated workflow templates, wherein each instance of an executing workflow is instantiated from one workflow template, further comprising:

means for providing a workflow template class including methods and objects to provide information on one workflow template associated with one workflow service;

means for instantiating a workflow template object maintaining information on one workflow template, wherein one or more workflow objects are associated with one workflow template object.

23. The system of claim 22, wherein the workflow service object includes information on one or more associated workflow templates, and wherein one method of the workflow service class is called to obtain information on the one or more workflow templates associated with the workflow service.

24. The system of claim 20, further comprising:

means for providing a workflow notification class including methods and objects to provide information on notifications associated with one workflow that generate a notification if an action associated with one work item is not performed in a specified time period; and means for instantiating one workflow notification object maintaining information on one workflow notification, wherein one or more workflow notifications are associated with one workflow and wherein one work list includes one or more workflow notifications.

25. The system of claim 20, further comprising:

means for instantiating one container object maintaining information on one container used in the workflow, wherein one container object is associated with one workflow object and one work item.

26. The system of claim 14, wherein the classes comprise object oriented classes.

27. An article of manufacture for executing a workflow, wherein the article of manufacture is enabled to execute operations on a processor, the operations comprising:

providing a workflow class implementing methods and objects to provide information on and control of workflows;

providing a work list class implementing methods and objects to provide information on and manipulate work items assigned to the workflows;

providing a work item class implementing methods and objects to provide information on and manipulate work items when executing one workflow;

providing a container class including methods and objects to provide information and control containers provided for workflows, wherein a container comprises an object that is used to transfer information among nodes by enabling users to read and write data to the container;

calling one method in the work list class to determine nodes and associated work items in the workflow to process;

calling one method in the work item class to lock a work item when providing a user access to workflow actions and documents associated with the work item; and calling one method in the work item class to unlock the work item after the user has completed all actions associated with the work item.

28. The article of manufacture of claim 27, the operations further comprising:

calling methods in the workflow class to begin and terminate an instance of one workflow comprising nodes;

calling methods in the work list class to obtain information on the work items and nodes in one workflow; and calling the methods in the work item class to enable a user to perform actions associated with one work item in one workflow, wherein at least one work item is associated with each node in the workflow.

29. The article of manufacture of claim 27, the operations further comprising:

providing a workflow notification class including methods and objects to provide information on notifications associated with the workflows, wherein one notification is generated if an action associated with one work item is not performed in a specified time period; and calling methods in the workflow notification class to obtain information on one notification and control a state of the notification.

30. The article of manufacture of claim 27, the operations further comprising:

providing a workflow service class including methods and objects to provide information on workflows associated with one workflow service; and calling one method in the workflow service class to obtain a list of all workflows associated with one workflow service.

31. The article of manufacture of claim 27, the operations further comprising:

calling the methods in the container class to read and write data to the container for one at least one user of one work item.

32. The article of manufacture of claim 31, the operations further comprising:

calling methods in the work item class to make one container associated with one work item available to one user of one work item; and calling one method in the work item class to enable one user of one work item at a next node in the workflow access to the container.

33. The article of manufacture of manufacture of claim 27, the operations further comprising:

instantiating a workflow object maintaining information on one workflow, wherein the methods of the workflow class obtain information and control the workflow through variables in the workflow object representing the workflow;

instantiating a work list object maintaining information on work items and nodes in one workflow, wherein the methods of the work list class obtain information on work items and nodes in one workflow; and instantiating one work item object for each work item in one workflow, wherein the methods of the work item class obtain information on work items from the work item objects, wherein one work list object identifies one or more work items represented by work item objects and wherein one workflow object is associated with one or more work items.

34. The article of manufacture of claim 33, the operations further comprising:

providing a workflow service class including methods and objects to provide information on workflows associated with one workflow service; and instantiating a workflow service object maintaining information on workflows and work lists for the workflows associated with one workflow service, wherein the methods of the workflow service obtain information on workflows and work lists from the workflow service object.

35. The article of manufacture of claim 34, wherein the workflow service object includes information on associated workflow templates, wherein each instance of an executing workflow is instantiated from one workflow template, further comprising:

providing a workflow template class including methods and objects to provide information on one workflow template associated with one workflow service; and instantiating a workflow template object maintaining information on one workflow template, wherein one or more workflow objects are associated with one workflow template object.

36. The article of manufacture of claim 35, wherein the workflow service object includes information on one or more associated workflow templates, and wherein one method of the workflow service class is called to obtain information on the one or more workflow templates associated with the workflow service.

37. The article of manufacture of claim 33, the operations further comprising:

providing a workflow notification class including methods and objects to provide information on notifications associated with one workflow that generate a notification if an action associated with one work item is not performed in a specified time period; and instantiating one workflow notification object maintaining information on one workflow notification, wherein one or more workflow notifications are associated with one workflow and wherein one work list includes one or more workflow notifications.

38. The article of manufacture of claim 33, the operations further comprising:

instantiating one container object maintaining information on one container used in the workflow, wherein one container object is associated with one workflow object and one work item.

39. The article of manufacture of claim 27, wherein the classes comprise object oriented classes.

* * * * *